United States Patent [19]

Pecone

[11] Patent Number: 5,581,693
[45] Date of Patent: Dec. 3, 1996

[54] METHOD AND APPARATUS FOR INHIBITING COMPUTER INTERFACE CLOCKS DURING DIAGNOSTIC TESTING

[75] Inventor: Victor Pecone, Austin, Tex.

[73] Assignee: Dell USA, L.P., Austin, Tex.

[21] Appl. No.: 566,278

[22] Filed: Dec. 1, 1995

Related U.S. Application Data

[63] Continuation of Ser. No. 92,314, Jul. 14, 1993, abandoned.

[51] Int. Cl.$^6$ ...................................................... G06F 11/00
[52] U.S. Cl. .................................... 395/183.01; 395/183.1
[58] Field of Search ........................... 395/183.01, 183.1, 395/183.18, 183.19, 183.2, 183.22

[56] References Cited

U.S. PATENT DOCUMENTS

| | | | |
|---|---|---|---|
| 4,581,738 | 4/1986 | Miller et al. | 371/18 |
| 4,692,691 | 9/1987 | Sueta | 371/25.1 |
| 4,740,887 | 4/1988 | Rutenberg | 371/9.1 |
| 4,969,148 | 11/1990 | Nadeau-Dostie et al. | 371/21.1 |
| 5,253,359 | 10/1993 | Spix et al. | 395/575 |

FOREIGN PATENT DOCUMENTS

| | | |
|---|---|---|
| 61-147346 | 7/1986 | Japan . |
| 03-17748 | 1/1991 | Japan . |

*Primary Examiner*—Hoa T. Nguyen
*Attorney, Agent, or Firm*—Henry N. Garrana; Mark P. Kahler; Michelle M. Turner

[57] ABSTRACT

An apparatus and method for a computer system that selectively disables expansion peripheral interface devices so that they do not interfere with diagnostic testing of related computer system peripheral interface devices. The present invention selectively disables the peripheral interface devices by control of the clock signals thereto. The clock signals may be selectively controlled by means of a software test program that may also be used to automate the diagnostic testing of the computer system. In addition, the computer system may be remotely tested and diagnosed because the present invention makes it unnecessary for the physical removal of devices that may cause false signal responses during the diagnostic tests.

5 Claims, 2 Drawing Sheets

METHOD AND APPARATUS FOR INHIBITING COMPUTER INTERFACE CLOCKS DURING DIAGNOSTIC TESTING

This is a continuation of application Ser. No. 08/092,314, filed Jul. 14, 1993, now abandoned.

BACKGROUND OF THE INVENTION

1. Field of the Invention

This invention relates generally to computers, and in particular, to testing of computer peripheral interface devices.

2. Description of the Related Technology

Personal computers are becoming more prevalent in the work place, and with more and more people depending on their livelihoods from the use thereof. Increased sophistication of the personal computers coupled with the computer user's dependency thereon have driven the computer manufacturers to improve computer system reliability and mean time to repair when a problem occurs.

The computer system comprises a plurality of subsystems and peripherals that may be tested individually to determine which part of the computer system is causing the malfunction. Once the general area of the problem is ascertained, a more specific subsystem or peripheral test may be utilized to pin point the problem and enable the computer service technician to repair same.

When two peripheral interface devices share the same or similar functionality such as, for example, a system motherboard video interface and an expansion video interface adapted for connection to the computer system local bus, testing of one or the other may require removal or disabling of the interface not being tested. As an example, when there is a video system problem the technician must ascertain whether the problem is being caused by the system board interface or the expansion interface. Heretofore, the technician would have to physically remove the expansion interface from the computer system to see if the problem disappeared.

Finding a problem in the computer system, using the aforementioned method of trouble shooting, was extremely labor intensive, time consuming and expensive. In addition, there was always a possibility of creating additional problems by removing and replacing the hardware from the computer system. Ideally, what is needed is a method and apparatus that would allow the testing of subsystems without having to physically disconnect parts of the computer system.

Computer system peripheral manufacturers started implementing embedded diagnostic software or firmware programs that could be utilized to more easily pinpoint the trouble. This enhanced trouble shooting and was extremely effective as computer systems became more sophisticated, and the number and type of peripheral interface devices increased. The inevitable happened, however, when one peripheral interface device interfered with the testing of another peripheral interface device.

One peripheral interface device may interfere with another when running diagnostics on a computer system having a plurality of interface devices, from a variety of different manufacturers, some of which do not behave passively when held in reset. Computer system peripheral devices such as, for example, video controller interfaces may have diagnostic programs embedded within firmware supplied as part of the overall peripheral interface control logic program. The embedded diagnostic programs may, for example, check video memory for proper operation and display color video test patterns for verifying overall video system performance.

Most computer systems are supplied with a video interface controller as an integral part of the system printed circuit board or "motherboard". Various peripheral interfaces are integrated onto the computer system motherboard; however, as new technology is developed, the computer system user may elect to add the newer technology interfaces to the computer system. A recently developed high speed host computer local bus interface has been implemented into present day personal computer systems. This high speed local bus may be utilized for cache memory, communications and high resolution color graphic video. The video adapter utilized on the local bus may conform to the proposed Video Electronics Standards Association standard for advanced local bus video controllers (VESA/VL).

The purpose of the VESA/VL standard is to specify uniform interface, architecture, timing, electrical, and physical characteristics that will allow VESA/VL based products from various different manufacturers to be interchangeable in a computer system. Even with standards such as the VESA/VL, problems arise between various different peripheral interface devices that were not taken into consideration by the applicable standards. Even if a standard does cover a particular compatibility problem, not all manufacturers may entirely comply with the standard. Thus, some way must be found for the computer system itself to control possible erratic behavior between a multitude of different peripheral interface devices during testing or self diagnosis.

What is needed is a way to control the various peripheral interface devices residing within the computer system without having to physically remove any peripherals therefrom. Preferably, the computer system itself will maintain control and have the ability to disable any offending peripheral device not conforming to an applicable interface operating standard or, in the alternative, the aberrant or erratic operation of a peripheral, not covered by an appropriate standard, may nevertheless be effectively disabled so as not to detrimentally interfere during computer system testing.

SUMMARY OF THE INVENTION

The foregoing problems are solved and a technical advance is achieved by a system and method for disabling clock signals to any expansion peripheral interface device not being tested when a computer system peripheral interface on the system motherboard is being tested. It is therefore an object of the present invention to disable the clock to selected peripheral interface devices when testing other peripheral interface devices, wherein the possibility of extraneous false signals being generated by a peripheral interface not being tested is greatly reduced. Thus, the computer subsystems and peripheral interfaces may be individually tested without having to remove a possibly false signal generating peripheral interface that may share common functionality with the subsystem under test.

In one embodiment, the present invention further enhances testing and diagnostics by utilizing software or firmware program steps that selectively enables the clock for each subsystem or peripheral under test and disables the clocks for the other subsystems or peripherals that may cause false signals or other problems when doing the diagnostic tests. In addition, queuing of embedded diagnostics for each selected device under test may be coordinated with the clock control. This gives an integrated and easily automated diagnostic test procedure that may be initiated and evaluated by the computer user without requiring the intervention of an experienced technician.

An advantage of the present invention is to enable fully automated testing to be performed remotely. The present invention eliminates having to physically remove expansion peripheral interface devices and subsystems from the computer system in order to isolate a problem. Thus, more time and cost effective trouble shooting of a computer system may be realized even for those computer systems in remote parts of the world.

In one aspect of the invention, a controller is used for controlling clock signals to a plurality of peripheral interface devices or computer subsystems. The clock signal controller may receive a clock signal from the computer system clock signal generator and derive the controlled clock signals used for the plurality of peripheral interface devices. Each expansion peripheral interface may utilize a unique controlled clock output from the clock signal controller. In this way, each expansion peripheral interface may be effectively inhibited without causing unnecessary computer system timing upset. In addition, peripheral interfaces and subsystems on the computer system motherboard may also be controlled in the above mentioned fashion.

In another aspect of the invention, the clock controller is easily controlled by software program instructions. A device clock enablement register may be utilized wherein each device having a controllable clock has a corresponding bit position in the register. By setting or clearing the respective bits, each peripheral interface clock signal may be enabled or disabled, respectively. The register outputs may be connected to the combinatorial logic controlling circuits which allow the computer system clock to pass therethrough when so enabled.

Other and further objects, features and advantages will be apparent from the following description of a preferred embodiment of the invention, given for the purpose of disclosure and taken in conjunction with the accompanying drawings.

DETAILED DESCRIPTION OF A PREFERRED EMBODIMENT

Computer System

Figure 1:
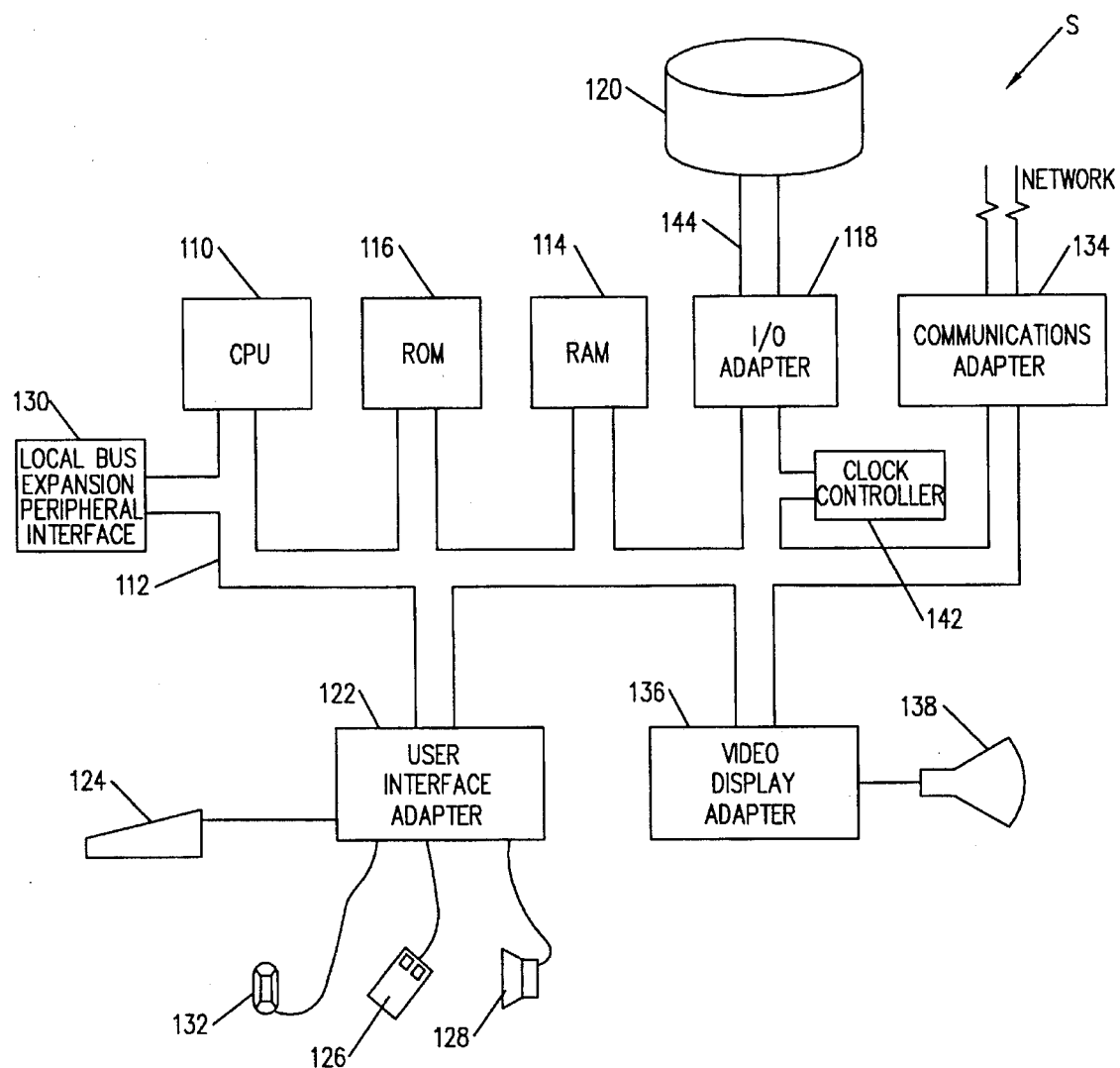
FIG. 1 is a block diagram of a computer system utilizing the present invention.

Referring now to the drawings, the details of the preferred embodiment are illustrated. In the drawings the letter "S" designates generally a computer system. FIG. 1 illustrates a representative hardware configuration of a computer system S in accordance with the present invention.

The computer system S has a central processing unit 110, such as a conventional microprocessor, and a number of other devices interconnected via a computer system local bus 112. The computer system S comprises a random access memory 114 (RAM), a read only memory 116 (ROM), an I/O adapter 118 for connecting ISA or ESIA peripherals 120, a clock controller 142, a local bus expansion peripheral interface 130, a user interface adapter 122 for connecting a keyboard 124, a mouse 126, a speaker 128, a microphone 132, and a video graphics controller 136 adapted for driving a video display 138.

Operation of a Preferred Embodiment

Figure 2:
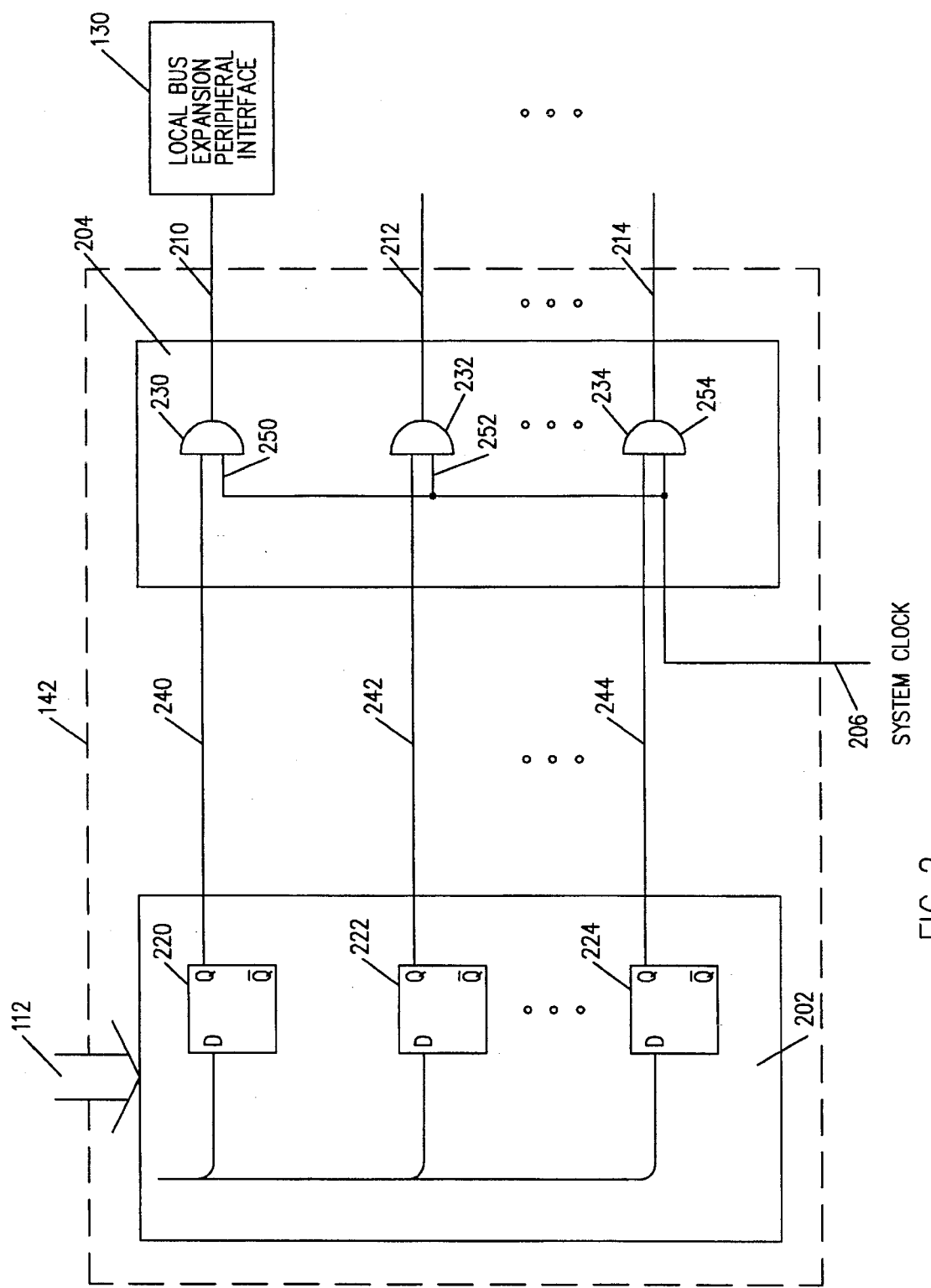
FIG. 2 is a block diagram of a preferred embodiment of the present invention.

The present invention consists of the clock controller 142 adapted to control clock signals to expansion peripheral interface devices such as, for example, interface 130. Referring now to FIG. 2, a block diagram illustrates the functional operation of the method and apparatus of a preferred embodiment of the present invention. The clock controller 142 consists of a storage register 202 and a clock control means 204. The CPU 110 communicates with the storage register 202 on the bus 112 through bus transceivers and bus control logic (not illustrated).

The storage register 202 stores clock control information in flip-flops 220, 222 and 224. These flip-flops 220, 222 and 224 may be set or cleared under software program control of the CPU 110. The outputs of the flip-flops 220, 222 and 224 are connected to the first inputs 240, 242 and 244 of AND gates 230, 232 and 234, respectively. The computer system clock 206 is connected to the second inputs 250, 252 and 254 of AND gates 230, 232 and 234, respectively. Whenever an output of a flip-flop is at a logic low, the respective first input of an AND gate prevents the AND gate from passing the clock 206.

In this way a clock may be inhibited to the various expansion peripherals such as, for example, the local bus peripheral interface 130, the video graphics controller 136, or any other peripheral interface device or subsystem of the computer system S. As an example, for clock 210 to reach the clock input of the local bus peripheral interface 130, the flip-flop 220 must be set wherein a logic high is on input 240. Whenever clock signal 206 reaches the AND gate 230 at input 250, the output 210 replicates the system clock 206. If, for example, flip-flop 222 is reset, i.e., has a logic low on input 242, then no clock signal from the clock 206 may pass through the AND gate 232. Thus, the output 212 of AND gate 232 is inhibited and no clock pulses can be sent to the peripheral interface device connected thereto.

Controlling the clock outputs (illustrated as outputs 210, 212 and 214) enables the present invention to selectively enable and disable the plurality of peripheral interface devices and computer subsystems in accordance with a diagnostic test program that may initiate further embedded diagnostic programs in each device under test. The logic (ANDs 230, 232 and 234) of the clock control means 204 may also be utilized as a clock signal buffer where one or more of the outputs 210 through 214 are not controlled. Thus, the present invention allows a combination of both controlled clock signals and buffered non-controlled clock signals that may be utilized throughout a computer system.

Any computer system performing diagnostic testing of its peripheral interfaces or subsystems, and having a problem of related devices responding when they should not, may benefit from the present invention. The present invention may be utilized with any type of computer system utilizing clocked peripheral interfaces or subsystems. Other logic means may be used to practice the present invention such as, for example, a programmable logic array (PLA), application specific integrated circuit (ASIC) or other digital logic circuit means well known to those skilled in the art of digital electronic circuit design.

The system and method of the present invention, therefore, is well adapted to carry out the objects and attain the ends and advantages mentioned, as well as others inherent therein. While a presently preferred embodiment of the invention has been given for purposes of disclosure, numerous changes in the details of construction, interconnection and arrangement of parts will readily suggest themselves to those skilled in the art, and which are encompassed within the spirit of the invention and the scope of the appended claims.

What is claimed is:

1. A method for testing a selected peripheral interface device connected to a local bus in a computer system that includes a CPU, a clock control circuit, and a plurality of peripheral interface devices including said selected peripheral interface device connected to the local bus, the method comprising the steps of:

providing a system clock signal to the selected peripheral interface device;

executing a software command in said CPU to cause said clock control circuit to inhibit the system clock signal from being received by the other peripheral interface devices to thereby prevent a clocked operation of the other peripheral interface devices; and initiating a diagnostic program in said selected peripheral device for testing the selected peripheral interface device after providing the system clock signal to the selected peripheral interface device while inhibiting the clock signal from others of said plurality of peripheral interface devices.

2. The method of claim 1 wherein the step of executing a software command includes the further step of programming a configuration register of said clock control circuit, wherein said configuration register controls which of said plurality of interface devices receives said system clock signal.

3. The computer system of claim 2, wherein each of said plurality of peripheral devices has a control bit in said configuration register.

4. The computer system of claim 2, wherein the configuration register comprises a plurality of flip-flops.

5. The computer system of claim 1, wherein said diagnostic program in said selected peripheral device is initiated by a diagnostic test program in said CPU.

* * * * *